United States Patent Office 3,594,468
Patented July 20, 1971

3,594,468
GERMICIDAL COMPOSITIONS
Vincent R. Saurino, 708 NW. 5th St., Boca Raton, Fla. 33432, and Vladimir Tuma, 416 NW. 2nd Ave., Boynton Beach, Fla. 33435
No Drawing. Filed Apr. 1, 1969, Ser. No. 812,303
Int. Cl. A61l 23/00
U.S. Cl. 424—25
17 Claims

ABSTRACT OF THE DISCLOSURE

Broadly stated, the present spermicidal and germicidal compositions comprise, in combination, the following ingredients:

(A) 2[(2-hydroxy-5-nonyl-benzyl)-methylamino]ethane sulfonic acid and the pharmaceutically acceptable salts thereof (hereinafter referred to as the unsubstituted sulfonic acid), (B) {[3 - (dimethyl - amino - methyl) - 2 - hydroxy - 5 - nonyl-benzyl]methyl-amino}ethane sulfonic acid and the pharmaceutically acceptable salts thereof (hereinafter referred to as the substituted sulfonic acid), (C) Coco-benzyl-dimethyl ammonium halide, e.g. the chloride, bromide and iodide, and especially the chloride.

The above composition have been found to be biologically active against a wide range of organism including the venereal type organisms such as *Neisseria gonorrheae, Treponema pallidum* and other spirochetes, *Hemophilus ducreyii*, flagellates, such as *Trichomonas vaginalis* and related organisms.

The compositions exhibit unexpected and unusual properties of being spermicidal and, therefore, are particularly useful as a contraceptive which also controls and/or prevents infection with venereal disease organisms, e.g. *Neisseria gonorrhea* and *Treponema pallidum*.

---

The present invention is concerned with biostatic and biocidal compositions. More particularly, it is concerned with compositions which are effective in inhibiting the growth of (biostatic) and killing (biocidal) a wide range of organisms including gram-positive as well as gram-negative organisms. The composition may be formulated into a wide range of end products and uses among which are germicidal cleaning compositions for hospitals and the like, compositions for the control of mildew, algae and the like, paints which will control microbial corrosion, and cosmetics such as shaving creams and skin creams to control staphylocci in lesions. The compositions also exhibit unexpected and unusual properties of being spermicidal and, therefore, are particularly useful as a contraceptive which also controls and/or prevents infection with venereal disease organisms, e.g. *Neisseria gonorrhea* and *Treponema pallidum*.

The present combination of ingredients exhibits a highly synergistic effect in germicidal and spermicidal properties. While the individual ingredients are known, the present combination of ingredients and the resulting unexpected properties constitute a novel and unexpected discovery.

Broadly stated, the present compositions comprise, in combination, the following ingredients:

(A) 2[(2-hydroxy-5-nonyl-benzyl)-methylamino]ethane sulfonic acid and the pharmaceutically acceptable salts thereof (hereinafter referred to as the unsubstituted sulfonic acid), (B) 2 - {[3 - (dimethyl - amino - methyl) - 2 - hydroxxy - 5-nonyl-benzyl]methyl-amino}ethane sulfonic acid and the pharmaceutically acceptable salts thereof (hereinafter referred to as the substituted sulfonic acid), (C) Coco-benzyl-dimethyl ammonium halide, e.g. the chloride, bromide and iodide, and especially the chloride.

The sulfonic acids (A) and (B) themselves or their pharmaceutically acceptable salts may be used, e.g. the alkaline earth, alkali metal and ammonium salts. Especially suitable are the sodium, calcium, potassium and lithium salts, particularly the sodium salts.

The compositions may be formulated with considerable latitude as to proportions, but it is preferably that the sulfonic acid (B), i.e. the substituted sulfonic acid, be in a weight ratio with the sulfonic acid (A), i.e. the unsaturated sulfonic acid, of at least about 1 to 1 and up to about 5 to 1, calculated as the sodium salt. Preferably the ratio will be approximately 3 to 1.

The proportion of the third active ingredient (C) i.e. coco benzyl dimethyl ammonium halide, in relation to components (A) and (B), can be varied over a wide range, especially for spermicidal applications. In general there should be at least half as much of component (C) as of component (A), and ordinarily at least as much of component (C) as of component (A) on a weight basis. On the other hand, in general, the weight of component (C) should not exceed about 100 times that of component (A). Such compositions will generally be satisfactory as spermicides and/or germicides. However, since bactericidal and bacteriostatic control is particularly important, i.e. for a wide range of organisms, it is preferred to use between 10 and 60 times as much of component (C) as of component (A), preferably between 12 and 50 times as much.

The above compositions have been found to be biologically active against a wide range of organisms including the venereal type organisms such as *Neisseria gonorrheae, Treponema pallidum* and other spirochetes, *Hemophilus ducreyii*, flagellates, such as *Trichomonas vaginalis* and related organisms. The compositions having the preferred proportions set forth above are particularly effective against *Staphylococcus aureus* and as set forth below screening has been carried out using USDA Strain ATCC #6538 of this organism. Equally important, the above compositions are extremely effective spermicides with long time-period effectiveness. The compositions may be compounded for application with known carriers in dosage forms such as tablets, capsules, suppositories, powders, jellies, liquids, aerosol sprays, microencapsulations and treated fabric.

All of the ingredients in the present composition are commercially available and known to the art.

It should be fully appreciated that the sulfonic acids, the salts thereof (A) and (B) will not themselves provide the unexpected results of the present invention. Similarly the coco-benzyl-dimethyl ammonium halide e.g. the chloride, (C) will not provide the unexpected results of the present invention. It has been found that it is only with the combination of ingredients, according to the present invention that one obtains synergistically active compositions which are highly germicidal as well as spermicidal.

As will be appreciated, the active ingredients described above are very potent chemicals and for many applications it is desirable that they be diluted or otherwise mixed with solvents, diluents, dispersants, wetting agents, carriers and the like. For example, it is convenient to compound the active ingredients in a stock solution which can then be diluted further with suitable materials for any desired application formulations such as liquids, jellies, creams, tablets, etc.

This stock solution, as mentioned above, and/or the formulation supplied for use may contain wetting and dispersing agents to adjust surface tension, viscosity and wetting properties to improve the stability of the stock solution and/or to provide appropriate physical properties for any particular application. These may include such well known materials as poly-oxy-ethylene ethers, tri-decyl-oxypoly (ethylene-oxy ethanols), poly-oxy-ethylated vegetable oils, mono- and di-esters of polyethylene glycol, alkyl-phenoxy-poly(ethylene-oxy) ethanols, modified ethoxylates, sorbitan ethers, poly-oxy-ethylated fatty alcohols, lauric diethanol-amides. Also suitable are surfactants such as the modified ethoxylated straight-chain alcohols. A combination of two or more wetting agents and/or surfactants may be used. Ordinarily such agents will be selected from those which are substantially biologically inert, e.g., where necessary so as to cause no irritation or other side effects. Preferably they are biodegradable and may be either non-ionic or amphoteric in their structure.

A wide range of inert solvents, dispersants and/or diluents may be used, both in stock solution and in dosage form products, among which notably are the lower alkanols, e.g. 1 to 20 carbon atoms, such as ethyl alcohol, butyl alcohol, isopropanol alcohol, dodecyl alcohol and the like. As will be appreciated, these have certain antibacterial properties of their own, although in tolerable quantities they are by no means as potent by themselves as the formulations of the present invention. Other solvents may be used alone or with the aforesaid alcohols, such as Butyl Cellosolve and the like. Furthermore, water, preferably distilled and/or demineralized, may also be used as a solvent or diluent. Many solid inert ingredients which may act as carriers or diluents are known in the art and include such materials as carboxy methyl cellulose, starches, salt, sodium bicarbonate, talc, sugar, dry milk solids and the like. As will be appreciated from the above, the choice of carriers, solvents and/or diluents is not critical and they may be selected according to the way in which the product will be stored and used as is well known in the art. For medical application carriers and diluents are selected from pharmaceutically acceptable materials, however, for other uses e.g. paint formulations, other materials may be used.

As noted above, the present compositions may be used in a wide range of end products and for a wide range of applications. For many applications, the concentration of the active ingredients is not critical. For example, the present compositions are quite effective against a broad range of organisms found in homes and hospitals either undiluted or in dilutions such as 1 to 20 or 1 to 200 and even as weak as 1 to 1500 (weight/volume). For other applications, such as application to the body, the concentration of active ingredients would ordinarily be limited to that necessary for the particular therapy intended, and with a view to avoiding irritation, depending on the part of the body to be treated. However, since undiluted compositions may not be convenient to handle, it may be preferable as mentioned above to form a stock solution of active ingredients which may be further compounded and/or diluted for various products. The stock solution may have active ingredients concentration of 5–75%, for example, 1 to 5% of the unsubstituted sulfonic acid or a salt (A), e.g. sodium salt, 5 to 25% of the substituted sulfonic acid or a salt (B), e.g. sodium salt and from 1–10% of the coco-benzyl-dimethyl ammonium chloride (C), dissolved in 5 to 25% isopropanol, 1 to 4% Butyl Cellosolve and the remainder being water and surfactants. A specific example of such a stock solution is given below.

| | Percent |
|---|---|
| 2-[(2-hydroxy - 5 - nonyl-benzyl)-methyl-amino] ethane sulfonic acid sodium salt | 3.75 |
| 2-{[3-(dimethyl-amino-methyl) - 2 - hydroxy - 5-nonyl-benzyl]methyl-amino}ethane sulfonic acid sodium salt | 11.25 |
| Coco-benzyl-dimethyl ammonium chloride | 51.00 |
| Isopropanol | 4.95 |
| Butyl Cellosolve | 9.00 |
| Water | 15.05 |
| Octyl-phenoxy-polyethoxy-ethanol (surfactant) | 5.00 |
| | 100.00 |

The table below gives the concentrations of active ingredients in the above stock composition in p.p.m. in a 1 to 200 dilution.

| | P.p.m. |
|---|---|
| 2-[(2-hydroxy - 5 - nonyl-benzyl)-methyl-amino] ethane sulfonic acid sodium salt | 187.5 |
| 2{[3-(dimethyl-amino-methyl) - 2-hydroxy-5-nonyl-benzyl]methyl-amino}ethane sulfonic acid sodium salt | 562.5 |
| Coco-benzyl-dimethyl ammonium chloride | 2550.0 |
| Isopropanol | 247.5 |
| Total active | 3547.5 |

In the above table, isopropanol, which is a solvent and diluent, has been listed as an active ingredient. While isopropanol is not an essential active ingredient according to the invention, the Federal Food and Drug Administration regards isopropanol as an active ingredient in pharmaceutical compositions and for the sake of completeness, it has been so listed in the table.

As noted above, a most important feature of the present invention resides in the discovery that the above compositions exhibit surprisingly remarkable germicidal and spermicidal properties. Therefore, for purposes of illustrating the unique properties of the present invention, the following examples will demonstrate the unusual and unexpected results of the present invention in connection with representative germicidal and spermicidal compositions. However, it should be clearly understood that the present invention is not limited to the specific illustrations but is applicable to the products and uses hereinbefore described.

EXAMPLE 1

The following three compositions were prepared by dissolving and/or dispersing the sulfonic acid salts (A) and (B) and the chloride (C) in the indicated quantity of isopropanol and then mixing with Butyl Cellosolve. The solutions were then mixed with the indicated surfactant and water.

| | (1) | (2) | (3) |
|---|---|---|---|
| Active ingredients, percent: | | | |
| 2-[(2-hydroxy-5-nonyl-benzyl)-methylamino]ethane sulfonic acid sodium salt (A) | 5.00 | 5.00 | 5.00 |
| 2-{[3-(dimethyl-amino-methyl)-2-hydroxy-5-nonyl-benzyl] methyl-amino}ethane sulfonic acid sodium salt (B) | 15.00 | 15.00 | 15.00 |
| Coco-benzyl-dimethyl ammonium chloride (C) | 4.25 | 4.25 | 4.25 |
| Isopropanol | 9.90 | 9.90 | 9.90 |
| Inert ingredients, percent: | | | |
| Butyl Cellosolve | 0.75 | 0.75 | 0.75 |
| Water | 50.10 | 50.10 | 50.10 |
| Octyl-phenoxy-polyethoxy-ethanol (Triton X-100) | 15.00 | | |
| Alkyl-phenyl-polyethylene-glycol-ether (Tergitol NPX) | | 15.00 | |
| Modified ethoxylated straight-chain alcohol (Surfactant DN 65, Rohm and Haas Co.) | | | 15.00 |
| Total | 100.00 | 100.00 | 100.00 |

The resulting three stock solutions were diluted with water at a ratio of one part stock solution to 899 parts of distilled water. These finally diluted solutions were tested for spermicidal activity according to the procedure of the IPPF test using two different semen samples, the first of which had an age of 5 hours and the second of which had an age of 4 hours. In each case, all spermatozoa were completely immobilized and effectively destroyed within less than 20 seconds.

EXAMPLE 2

The three stock solutions of Example 1 were diluted to a final dilution of 1 to 1000 and tested according to the IPPF test on spermatozoa of a 4 hour age. All spermatozoa were immobilized and effectively destroyed in less than 30 seconds.

EXAMPLES 3–7

The procedures of Example 1 were repeated with the stock solution (3) of Example 1 at the following dilutions and with spermatozoa samples as indicated in the following table, the results also being given in the table.

| Examples: | Spermatoza age history | Dilution * | Kill time all solutions (min.:sec.) |
|---|---|---|---|
| 3 | 4 | 1/1,200 | 0:45 |
| 4 | 4 | 1/1,400 | 1:20 |
| 5 | 4 | 1/1,999 | 1:10 |
| 6 | 5 | 1/1,999 | 1:05 |
| 7 | 3 | 1/1,600 | 1:15 |

* Dilutions are on a weight/volume basis.

As can be seen from the above tests, the compositions of the present invention are highly effective and fast acting spermicides, even in a very dilute concentration. Their low surface tension is considered helpful, in this regard, because they readily distribute themselves over a surface, providing effective coverage at low concentration. Furthermore, as will be appreciated from the above, the compositions are effective in a wide range of dilutions. For example, while a dilution of 1 to 200 is very effective, dilutions up to 1 to 1000 give exceedingly good results and dilutions up to 1 to 2000 still provide satisfactory results. Furthermore, the compositions may be used as a secondary spermicidal composition, i.e., such as in a douche or suppository at dilutions greatly exceeding 1 to 2000. Also, if desired, smaller dilutions may be used, for example, 1 to 50, or even the concentrated active ingredients with only enough carriers, diluents, wetting agents, etc. to provide adequate dispersal of the active ingredients may be used for particular applications, e.g. disinfecting.

In connection with suitable modes of application for combined spermicidal and germicidal results, the following are some of the formulations in which the active ingredients may be incorporated.

Tablets

Consisting of the stock solutions or dilutions thereof mixed with one or more pharmaceutically acceptable solid insert carriers. Preferably, the carriers used include agents which effervesce on contact with moisture, so as to quickly distribute the active ingredients, say when such tablets come into contact with vaginal fluids. The carriers should, preferably, be of the water-soluble type so that they ultimately can be removed with water.

Capsules

Capsules of gelatin or similar substances, which dissolve when in contact with vaginal or other fluids, and release the active components. Within the capsule, the active ingredients may be cut with pharmaceutically acceptable carrier which may be solid or a viscous liquid which does not dissolve the gelatin. The rate of solution may be predetermined and controlled by the nature and thickness of the material from which the capsule is made.

Suppositories

The active agents may be incorporated as ingredients of the usual type of suppository, composed of e.g. coco butter (without any protective coating such as in the capsule). The suppository may also contain the aforesaid effervescent but otherwise inert carrier material.

Powders

A powder formulation may be made by spraying the diluted concentrate upon a water-insoluble and non-effervescent inert base such as talc, etc., to be used as a dusting powder, etc., from which the active ingredients can exert their protective action.

Jellies

A water-based type of active vaginal jelly can be made by adding a pharmaceutically acceptable thickening agent, e.g. gum agar, into the diluted concentrate.

Liquids

A dilution of the concentrates themselves, to be used as a douche or for other sanitation purposes, either at low pressure or medium pressure, or as a mild pressure spray where large areas of the body are to be treated and/or protected.

Aerosol sprays

To be used in the same manner as an ordinary liquid spray, more or less, for surface contact and treatment, or as a douche spray under relatively low pressures but for greater penetration.

Microencapsulations

In gelatin or other similar coating materials, and in various degrees of solubility in vaginal and/or other fluids.

Treated fabrics

The compositions of this invention can be incorporated into woven, knitted and/or nonwoven fabrics, and/or combinations thereof. Fabrics thus treated can be used in contact with infected areas, in contact with certain other areas to serve as a mild preventative and/or protective medium, merely as a wiping cloth, etc., or to be as an integral part of intimate clothing.

For most spermicidal applications, where the spermicide is inserted into the vaginal tract, a total amount of active ingredients (dosage) for each application of at least 0.01 grain is normally required. However, for full protection, it is desirable that the dosage be at least 0.05 grain per application. Indeed, higher dosages of the active ingredients ordinarily will be used to completely insure spermicidal protection. In this connection, as a practical matter at least 0.1 grain are preferred, preferably at least 0.18 grain per application. Of course, greater dosages of the active ingredients may be used, but as will be appreciated, one would not use very much larger doses which accomplish little, if anything, e.g. 30 to 40 grains. At about 0.18 grain dosage, the spermicidal effect is total and exceedingly rapid. Higher dosages do not provide significantly greater spermicidal protection. Furthermore, exceedingly high concentrations of the present invention, which would be used to achieved high dosage, may cause irritation in the vaginal tract. Accordingly, in the preferred embodiment the active ingredients are used in dilutions of about 1 to 200 or more and in general no more than one milliliter of a solution of that dilution should be used in any one application in order to be safely below any irritation threshold. For example, where a spermicidal tablet is intended, the tablet may be compounded by spraying a 1 to 200 dilution of the above-described concentrate of active ingredients (e.g. about 25–75% active ingredients), or in a volatile solvent such as alcohol, onto a mixture of sodium bicarbonate and citric acid, e.g. 30–90 parts and 70–10 parts, respectively. For example, the composition may contain 0.5% active ingredients, 70% sodium bicarbonate and 24.5% citric acid (all by weight). Such a composition may be compressed by known methods into a 20 grain tablet which effervesces on contact with moisture, each tablet thus being proper for one dose (or one treatment). On this basis, therefore, each tablet will actually contain 0.1 grain of the active ingredients.

EXAMPLES 8–18

These examples not only demonstrate the quite unexpected high degree of germicidal properties of the present composition, but also illustrate the synergistic effect of the combined ingredients. Two concentrates were used to supply the active ingredients. The first contained the sulfonic acid salts (A) and (B) and water in the following percentages by weight.

| | Percent |
|---|---|
| 2 - [(2 - hydroxy - 5-nonyl - benzyl)-methyl-amino]ethane sulfonic acid sodium salt | 12.50 |
| 2-{[3-(dimethyl-amino-methyl)-2-hydroxy-5-nonyl - benzyl] methyl - amino}ethane sulfonic acid sodium salt | 37.50 |
| Water | 50.00 |
| | 100.00 |

The second concentrate contained the chloride (C) and Butyl Cellosolve in the following percentages by weight:

| | Percent |
|---|---|
| Coco-benzyl-dimethyl-ammonium-chloride | 85.00 |
| Butyl Cellosolve | 15.00 |
| | 100.00 |

The concentrates were mixed with water, isopropanol and the surfactant Triton X–100 (octyl phenoxy polyethoxy ethanol) in the proportions by weight indicated by the following table. Various dilutions of the resulting stock solution in water were evaluated against *Staphylococcus aureus*, USDA Strain ATCC #6538, with the percentages of kill shown in the table.

Hence, from the above, it can be seen that the present compositions have quite unexpected properties and are surprisingly effective as both a germicide and spermicide. The compositions can be made simply by mixing the active ingredients, and preferably dissolving and diluting in any inert liquid or liquids, and may be formed into a variety of products in a variety of forms for specific applications.

In the foregoing description, all parts and percentages are by weight except dilutions of stock solutions for liquid formulations which are on a weight/volume basis.

What is claimed is:

1. A spermicidal and germicidal composition useful as a contraceptive which also controls and/or prevents infections with unereal disease organisms containing as the essential active ingredients effective amounts of each of (A) 2-{(2-hydroxy-5-nonyl-benzyl)-methylamino]ethane sulfonic acid and the pharmaceutically acceptable salts thereof, (B) 2-{[3-(dimethyl-amino-methyl)-2-hydroxy-5-nonylbenzyl] methyl-amino}ethane sulfonic acid and the pharmaceutically acceptable salts thereof, and (C) coco-benzyl-dimethyl ammonium halide.

2. The composition of claim 1 wherein the ratio of the proportion by weight of the active ingredient (B) to the proportion by weight of active ingredient (A) is in the range 1:1 to 5:1 calculated as the sodium salts.

3. The composition of claim 2 wherein the ratio of the proportion of (C) to the proportion of (A) is at least about 0.5 to 1.

4. The composition of claim 3 in which the ratio of the proportion of (C) to the proportion of (A) is in the range 1:1 to 100:1.

5. The composition of claim 4 wherein the ratio of the proportion of (C) to the proportion of (A) is in the range 10:1 to 50:1.

6. A composition comprising the composition of claim 3 dispersed in an inert medium wherein the total proportion by weight of active ingredients (A), (B) and (C) to the inert medium is at least 1 to 200.

| | Control | Control | 740 | 741 | 742 | 743 | 744 | 745 | 746 | 747 | 748 | 749 | 778 | 779 | 780 | 781 |
|---|---|---|---|---|---|---|---|---|---|---|---|---|---|---|---|---|
| Example | 8 | 9 | 10 | 11 | 12 | 13 | 14 | 15 | 16 | 17 | 18 | 19 | 20 | 21 | 22 | 23 |
| Composition, parts by weight: | | | | | | | | | | | | | | | | |
| First concentrate [1] | 50 | | 40 | 40 | 40 | 40 | 50 | 50 | 30 | 40 | 30 | 20 | 20 | 10 | 10 | 0 |
| Second concentrate [2] | 0 | 50 | 10 | 20 | 30 | 40 | 20 | 30 | 50 | 50 | 60 | 60 | 70 | 70 | 80 | 90 |
| Isopropanol [3] | 10 | 10 | 10 | 10 | 10 | 10 | 10 | 10 | 10 | 5 | 5 | 5 | 5 | 5 | 5 | 5 |
| Triton X–100 | 10 | 10 | 10 | 10 | 10 | 10 | 10 | 10 | 10 | 5 | 5 | 5 | 5 | 5 | 5 | 5 |
| H₂O | 30 | 30 | 30 | 20 | 10 | 0 | 10 | 0 | 0 | 0 | 0 | 10 | 0 | 0 | 0 | 0 |

Percent kill of *Staphylococcus aureus* ATCC 6538

| | | | | | | | | | | | | | | | | |
|---|---|---|---|---|---|---|---|---|---|---|---|---|---|---|---|---|
| Example | 8 | 9 | 10 | 11 | 12 | 13 | 14 | 15 | 16 | 17 | 18* | 19* | 20* | 21* | 22 | 23 |
| Dilution by weight: | | | | | | | | | | | | | | | | |
| 1:500 | | | | 20 | 50 | 50 | 0 | 80 | 100 | 100 | 100 | 100 | 100 | 100 | 90/90 | 100/100 |
| 1:400 | | | | | 20 | 60 | | 70 | 90 | 80 | | 90 | 100 | 80 | 100 | 9 |
| 1:300 | | | 0 | 20 | 100 | 95 | 0 | 80 | 100 | 100 | 100 | 100 | 90 | 90 | 100 | 100 |
| 1:200 | | | 0 | 55 | 90 | 75 | 5 | 75 | 80 | 75 | 90 | 90 | 100 | 100 | 100 | 90 |
| 1:100 | | | 0 | 30 | 100 | 100 | 0 | 95 | 100 | 100 | | 100 | 100 | 100 | 100 | 90 |
| 1:90 | 20 | 0 | | | | | | | | | | | | | | |

[1] 12.5% sodium salt of sulfonic acid A, 37.5% sodium salt of sulfonic acid B, 50% H₂O.
[2] 85% chloride (C), 15% Butyl Cellosolve.
[3] 99% purity, 1% water.
*100% kill also at dilutions to 1:900.

As can be seen, the sulfonic acid salts alone have little effect even at 1:90 dilutions and the chloride alone has no effect even at 1:90 dilutions (see Examples 8 and 9) against the organism. Also at ratios of 40 to 10 (Example 10) no effects were measured. However, at ratios of 40 to 20 (Example 11) a significant effect is shown which carries through to ratios of 50 to 20 (Example 14) where no significant effect is seen on this organism. Again, significant effect is seen at ratios of 50 to 30 and 30 to 60 (Examples 15–18). Hence, the ratio of the chloride to the total sulfonic acid salts should be at least about 0.7 to 1 or the synergistic effect will not be obtained for applications including this extremely potent strain.

7. The composition of claim 6 wherein the active ingredients and inert medium are in the form of tablets, capsules, microencapsulations, suppositories, powders, jellies, liquids or aerosol sprays.

8. The composition of claim 3 wherein the composition is dispersed in an inert medium and the proportion by weight of active ingredients (A), (B) and (C) to inert medium is at least 1 to 20.

9. The composition of claim 8 wherein the composition is absorbed on woven and/or nonwoven fabrics, pads, cotton balls and swabs.

10. The composition of claim 3 wherein the ingredients (A) and (B) are the sodium salts.

11. The composition of claim 3 wherein the ingredients (A) and (B) are the sodium salts.

12. The composition of claim 1 containing also isopropyl alcohol.

13. A process for rendering gram-positive and gram-negative organisms biologically inactive comprising contacting said organisms with an effective amount of the composition of claim 3.

14. A process for rendering spermatozoa inactive comprising contacting them with an effective amount of the composition of claim 3.

15. The process of claim 14 wherein the composition is applied in the vaginal tract in a dosage of at least 0.05 grain.

16. The process of claim 14 wherein the composition is dispersed in an inert medium and the proportion of the composition to the proportion of the inert medium is not greater than about 1 to 200 parts by weight.

17. The process of claim 14 wherein the composition and inert medium are in the form of tablets, capsules, microencapsulations, suppositories, powder, jellies, liquids and/or aerosol sprays.

References Cited

UNITED STATES PATENTS

| | | | |
|---|---|---|---|
| 3,055,837 | 9/1962 | Wittwer | 252—161 |
| 3,057,805 | 9/1962 | Wittwer | 252—161 |
| 3,219,525 | 11/1965 | Berkow | 424—45 |
| 3,244,589 | 4/1966 | Sunnen et al. | 424—45 |
| 3,248,333 | 4/1966 | O'Roark | 252—144 |
| 3,384,541 | 5/1968 | Clark | 424—45 |
| 3,420,858 | 1/1969 | McCrimlisk | 260—400 |

OTHER REFERENCES

Harvey, C.: J. Reprod. Fertility 3: 124–131 (1962) "Spermicidal Activity of Surface-Active Agents."

SHEP K. ROSE, Primary Examiner

U.S. Cl. X.R.

15—209; 71—67; 106—15; 128—156, 251, 269, 270, 271; 252—91, 106, 152, 161, 306, 317; 424—27, 28, 37, 43, 44, 45, 47, 69, 73, 315, 329